United States Patent [19]
Ono

[11] Patent Number: 4,817,077
[45] Date of Patent: Mar. 28, 1989

[54] DEVICES FOR DETECTING DEFECTS OF DISC-SHAPED RECORD MEDIA

[75] Inventor: Junji Ono, Tokyo, Japan

[73] Assignee: Sony Corporation, Tokyo, Japan

[21] Appl. No.: 123,112

[22] PCT Filed: Feb. 3, 1987

[86] PCT No.: PCT/JP87/00068
§ 371 Date: Sep. 29, 1987
§ 102(e) Date: Sep. 29, 1987

[87] PCT Pub. No.: WO87/04847
PCT Pub. Date: Aug. 13, 1987

[30] Foreign Application Priority Data

Feb. 4, 1986 [JP] Japan .................. 61-22521

[51] Int. Cl.⁴ .................. G11B 5/09; G06F 11/00
[52] U.S. Cl. .................. 369/54; 369/44; 369/46; 369/48; 369/58; 369/59; 371/57; 371/61; 371/62
[58] Field of Search .................. 369/43, 44, 46, 54, 369/58, 59; 346/76 L; 371/57, 61, 62

[56] References Cited

U.S. PATENT DOCUMENTS

| | | | |
|---|---|---|---|
| 4,271,522 | 6/1981 | Droux et al. | 371/57 |
| 4,464,714 | 8/1984 | Huijser et al. | 369/44 X |
| 4,467,462 | 8/1984 | Shibata | 369/46 X |
| 4,587,644 | 5/1986 | Fujiie | 369/44 X |
| 4,593,386 | 6/1986 | Kuwabara et al. | 369/46 X |
| 4,598,394 | 7/1986 | Nonaka | 369/44 |
| 4,603,410 | 7/1986 | Yoshida | 369/46 X |
| 4,700,334 | 10/1987 | Shinkai | 369/46 X |
| 4,730,294 | 3/1988 | Funada | 369/46 X |
| 4,736,354 | 4/1988 | Yoshio | 369/46 X |
| 4,744,069 | 5/1988 | Sugiyama et al. | 369/46 X |
| 4,748,609 | 5/1988 | Yonezawa et al. | 369/46 X |

Primary Examiner—William L. Sikes
Assistant Examiner—Brian M. Healy
Attorney, Agent, or Firm—Lewis H. Eslinger; Jay H. Maioli

[57] ABSTRACT

A defect in an information signal recorded in a spiral track on an optical disc is detected based on a low level portion of an envelope of a reproduced information signal. When periods between detection output pulses each measured from the leading edge of the detection output pulse are equal to each other, a pulse having its leading edge at a time point after the leading edge of said detection output pulse and its trailing edge at a time point of the trailing edge of said detection output pulse or a time point after the trailing edge of said detection output pulse is produced to be used as a defect detection signal. The defect detection signal is used for preventing tracking servo-control and focus servo-control for an optical head from being performed abnormally.

6 Claims, 4 Drawing Sheets

DEVICES FOR DETECTING DEFECTS OF DISC-SHAPED RECORD MEDIA

TECHNICAL FIELD

The present invention relates to a device for detecting a defect of a disc-shaped record medium, which generates a defect detection output signal at the time when the defect of the disc-shaped record medium comes to a reading position during reproduction of an information signal recorded in a spiral recording track on the disc-shaped record medium.

TECHNICAL BACKGROUND

In a disc player for reproducing an information signal from an optical disc, such as an optical digital audio disc, on which the information signal is recorded in the form of small pits arranged in a spiral track, a light beam is used for reading the information signal from the spiral track. The light beam is emitted from an optical head which is moved in the direction of the radius of the optical disc so as to scan the spiral track on the optical disc which is in a state of revolutions at a predetermined speed, and the light beam is required to trace correctly the spiral track and to be focused correctly on the surface of the optical disc on which the spiral track is formed. To make the light beam comply with these requirements, tracking servo-control and focus servo-control are performed. In the tracking servo-control, the position of a beam spot formed by the light beam on the optical disc in relation to the spiral track is detected to produce a tracking detection output and an optical element, such as a focusing lens, in the optical head or the optical head in its entirety is moved in the direction of the radius of the optical disc in response to the tracking detection output so as to cause the position of the beam slot to be placed correctly on the spiral track. In the focus servo-control, a focus condition of the light beam on the optical disc is detected to produce a focus detection output and the focusing lens in the optical head or the optical head in its entirety is moved in the direction of an axis of rotation of the optical disc in response to the focus detection output so as to cause the light beam to be focused correctly on the optical disc.

The tracking detection output is obtained in the form of a tracking error signal representing deviations of the beam spot on the optical disc from the center of the spiral track and the focus detection output is obtained in the form of a focus error signal representing defocus of the light beam on the optical disc. The tracking error signal and the focus error signal are usually derived from an information signal reproducing section together with a reproduced information signal. In the information signal reproducing section, a reading light beam, which comes from a portion of the optical disc on which the light beam emitted from the optical head is caused to impinge and modulated in intensity, is detected by a plurality of light detecting elements forming together a photodetector and detection output signals obtained from the light detecting elements in the photodetector are calculated at a signal processing circuit. Then, control signals are produced respectively based on the tracking error signal and the focus error signal which are derived from the information signal reproducing section containing the photodetector and the signal processing circuit, and supplied to driving means for moving the optical element such as the focusing lens in the optical head or the optical head in its entirety in the direction of the radius of the optical disc or the direction of the axis of rotation of the optical disc. As a result, the optical element such as the focusing lens in the optical head or the optical head in its entirety is moved in the direction of the radius of the optical disc or the direction of the axis of rotation of the optical disc in response to each of the tracking error signal and the focus error signal.

When the information signal is reproduced from the spiral track on the optical disc under the tracking servo-control and the focus servo-control performed as mentioned above in the disc player, and in the case where the optical disc has a defect where the surface or inside thereof is damaged or stained, the defect is read by the light beam emitted from the optical head to impinge thereon and the detection output signals obtained from the light detecting elements forming the photodetector are provided with variations caused in response to the defect of the optical disc. These variations in the detection output signal obtained from the light detecting elements bring about a missing portion of the reproduced information signal obtained from the signal processing circuit, which has such an extraordinarily low level as to be out of a predetermined range of the amplitude of the reproduced information signal, and further give rise to a relatively large noise in the form of a pulse in each of the tracking error and focus error signals derived from the signal processing circuit. That is, the defect of the optical disc results in the missing portion of the reproduced information signal and the relatively large noise in each of the tracking error and focus error signals.

The relatively large noise in the tracking error signal or the focus error signal resulting from the defect of the optical disc causes the control signal, which is supplied to the driving means for moving the optical element such as the focusing lens in the optical head or the optical head in its entirety in the direction of the radius of the optical disc or the direction of the axis of rotation of the optical disc, to take up an extraordinary level. Then, In the case where the control signal taking up such an extraordinary level is supplied to the driving means, the optical element such as the focusing lens in the optical head or the optical head in its entirety is moved abnormally so that the tracking servo-control or the focus servo-control is not properly carried out.

In the manner as mentioned above, an undesirable operation state wherein the tracking servo-control or the focus servo-control is not properly performed is easily caused in the disc player when the defect portion of the optical disc is read by the light beam emitted from the optical head.

To avoid such an undesirable operation state caused in the disc player, there has been proposed to provide a disc player with an arrangement for conducting a defect detection by which an operation state wherein the defect of the optical disc is read is detected in an information signal reproducing section including a photodetector and a signal processing circuit and for preventing both the tracking servo-control and the focus servo-control from being carried out abnormally when an output of the defect detection, namely, a defect detection output is obtained. In this arrangement proposed previously, the defect detection is carried out based on the reproduced information signal derived from the signal processing circuit in such a manner as mentioned below.

Figure 1A:
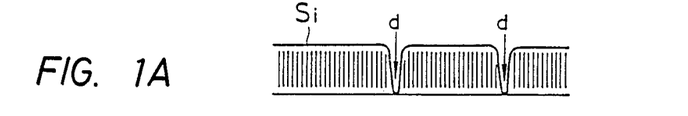
FIGS. 1A, 1B and 1C are waveform diagrams used for explaining an operation state wherein a defect of an optical disc is read in a disc player.
Figure 1B:
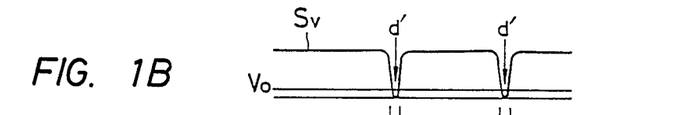

When the defect of the optical disc is read, a reproduced information signal Si comprises missing portions d each having a width corresponding to the width of the defect, as shown in FIG. 1A. Since the defect of the optical disc extends usually over several convolutions of the spiral track formed on the optical disc, the missing portions d occur periodically during a period of time depending on the size of the defect. The reproduced information signal Si containing the missing portions d is supplied to an envelope detector and a detection output signal Sv having a voltage level which corresponds to the envelope level of the reproduced information signal Si, as shown in FIG. 1B, is obtained from the envelope detector.

Figure 1C:
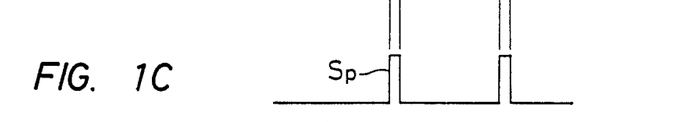

The detection output signal Sv has low level portions d' corresponding to the missing portions d contained in the reproduced information signal Si. Then, the level of the detection output signal Sv is compared with a reference voltage level Vo set as shown in FIG. 1B, and as a result, pulses Sp each taking up a high level in response to a portion of the detection output signal Sv which has a voltage level lower than the reference voltage level Vo, namely, the low level portion d' of the detection output signal Sv, as shown in FIG. 1C, are obtained.

In the case where pulses Sp thus obtained are used directly as the defect detection output successively from the first one thereof, false detection of the defect of the optical disc is apt to be caused. Accordingly, on the basis of the fact that the pulse Sp which result actually from the defect of the optical disc occurs for every revolution of the optical disc during a certain period of time in the same manner as the missing portion d in the reproduced information signal Si, the pulses Sp are supplied to an integration circuit having a predetermined integration time constant to be integrated in level and the defect detection output is destined to be made based on each of the pulses Sp which are obtained after an output level of the integration circuit reaches a predetermined voltage level.

A defect detecting part of the previously proposed arrangement which is operative to detect the operation state wherein the defect of the optical disc is read in such a manner as aforementioned comprises a circuit block including the integration circuit and produces the defect detection output after the defect of the optical disc is read and thereby the pulse Sp is obtained within a period of time of each one revolution of the optical disc. Therefore, the defect detection output derived from the defect detection part is delayed compared with a time point at which the defect of the optical disc is read actually. The time-lag arising thus on the defect detection output results in a problem that each of the tracking servo-control and the focus servo-control are not prevented effectively from being carried out abnormally in the operation state wherein the defect portion of the optical disc is read. Further, reliability in producing the defect detection output in response to the pulse Sp at the defect detection part is deteriorated due to the delay of the defect detection output.

DISCLOSURE OF THE INVENTION

Accordingly, it is an object of the present invention to provide a device for detecting a defect of a disc-shaped record medium, which generates a defect detection output signal without time-lag surely and precisely when the defect formed in or on the disc-shaped record medium is read during reproduction of an information signal recorded in a spiral recording track on the disc-shaped record medium performed in a disc player.

Figure 2:
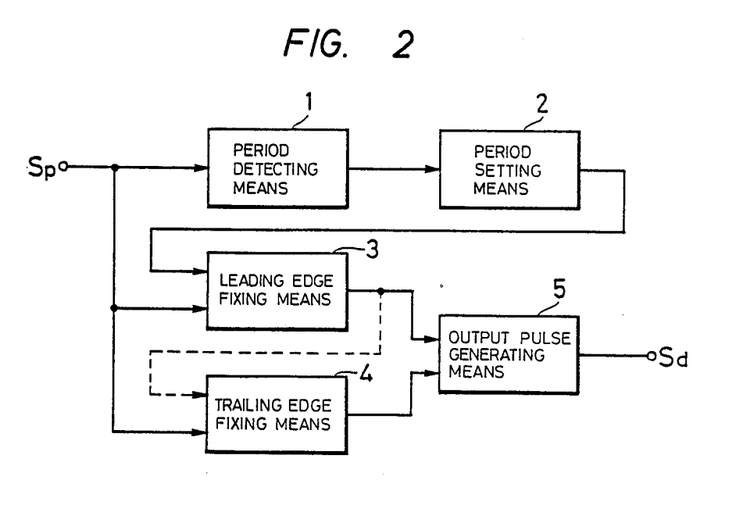
FIG. 2 is a schematic block diagram showing a fundamental configuration of a device for detecting a defect of a disc-shaped record medium according to the present invention.

To achieve the end described above, the device for detecting a defect of a disc-shaped record medium according to the present invention comprises, as a fundamental configuration thereof is shown in FIG. 2, period detecting means 1 for measuring a period of input pulses Sp which are obtained whenever the defect of the disc-shaped record medium is read, period setting means 2 for setting up a period of time shorter than the period of the input pulses Sp detected by the period detecting means 1, leading edge fixing means 3 for fixing a time point of a leading edge of an output pulse Sd at a first time point at which the period of the input pulses Sp is detected by the period detecting means 1 or a second time point to which a time corresponding to the period of time set up by the period setting means 2 elapses from a time point of a leading edge of one of the input pulses Sp appearing after the first time point, trailing edge fixing means 4 for fixing a time point of a trailing edge of the output pulse Sd at a time point of a trailing edge of one of the input pulses Sp appearing after the time point of the leading edge of the output pulse Sd set up by the leading edge fixing means 3 or a third time point to which a predetermined time elapses from the time point of the leading edge of the output pulse Sd fixed by the leading edge fixing means 3, and output pulse generating means 5 for producing the output pulse Sd having its pulse width corresponding to a period of time from the time point fixed by the leading edge fixing means 3 to the time point fixed by the trailing edge fixing means 4 and sending out the output pulse Sd as a defect detection output signal in relation to the disc-shaped record medium.

In the device for detecting a defect of a disc-shaped recording medium thus constituted according to the present invention, first the period of the input pulses Sp is measured by the period detecting means 1 when the input pulses Sp are supplied, and then the period of time which is shorter than the period of the input pulses Sp measured by the period detecting means 1 is set up by the period setting means 2. Next, the time point of the leading edge of the output pulse Sd is fixed at the first time point or the second time point by the leading edge fixing means 3, and further the time point of the trailing edge of the output pulse Sd is fixed at the time point of the trailing edge of one of the input pulses Sp appearing after the time point fixed by the leading edge fixing means 3 or the third time point by the trailing edge fixing means 4. Then, the output pulse Sd is generated by the output pulse generating means 5 so as to have its leading edge at the time point fixed by the leading edge fixing means 3 and its trailing edge at the time point fixed by the trailing edge fixing means 4, and sent out as the defect detection output signal from the output pulse generating means 5.

Through the operation mentioned above, the output pulse Sd is formed to have its leading edge at a time point before the leading edge of one of the input pulses Sp and its trailing edge at a time point of the trailing edge of the same input pulse Sp or a time point thereafter, and surely sent out without time-lag as the defect detection output signal when the defect formed on or in the disc-shaped record medium is read. As a result, the defect detection output signal Sd is obtained with improved precision in time when the defect of the disc-shaped record medium is read.

Accordingly, in the case where the defect detection output signal which is generated by the device according to the present invention is used for restraining the tracking servo-control or the focus servo-control when the defect of the disc-shaped record medium is read in the disc player, the tracking servo-control or the focus servo-control is prevented timely and effectively from being carried out abnormally in response to the defect detection output signal obtained by the device according to the present invention.

AN EMBODIMENT MOST PREFERABLE FOR WORKING OF THE INVENTION

Figure 3:
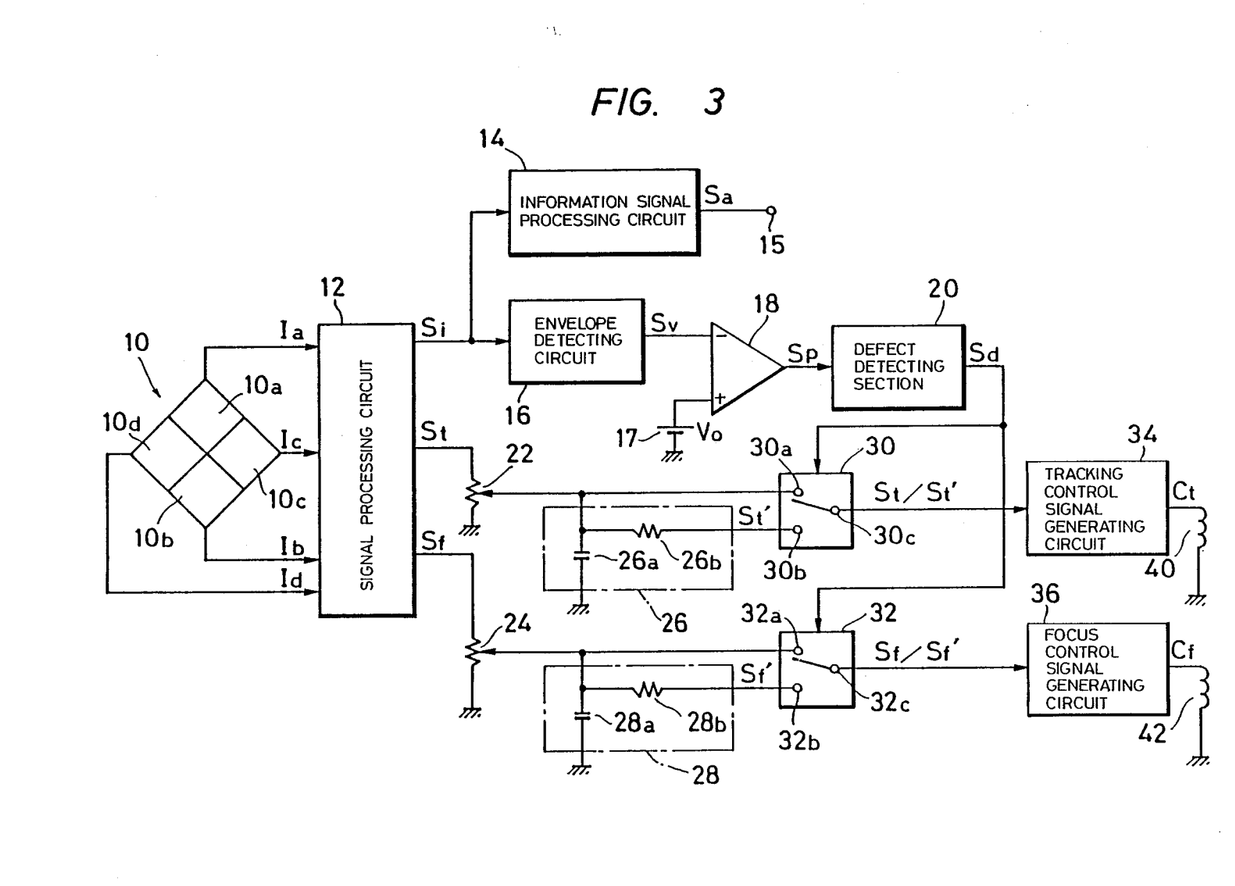
FIG. 3 is a schematic block diagram showing a part of a disc player to which an embodiment of device for detecting a defect of a disc-shaped record medium according to the present invention is applied.

FIG. 3 shows an example of a device for detecting a defect of a disc-shaped record medium according to the present invention, together with a part of a disc player to which the example is applied. The disc player is operative to reproduce an information signal recorded in a spiral track formed on a recording plane of an optical disc, as aforementioned.

In the example shown in FIG. 3, a reading light beam, which emerging from a portion of the optical disc revolving at a constant linear velocity on which a light beam emitted from an optical head is caused to impinge and modulated in intensity, is guided through an objective lens to four light detecting elements 10a, 10b, 10c and 10d which form a photodetector 10 to form a beam spot on the light detecting elements 10a to 10d. The light detecting elements 10a to 10d produce respective output signals Ia, Ib, Ic and Id each corresponding to a portion of the beam spot formed on each of the light detecting elements 10a to 10d, and the output signals Ia to Id are supplied to a signal processing circuit 12. In the signal processing circuit 12, the output signals Ia to Id are subjected to arithmetic operation so as to produce a reproduced information signal Si corresponding to the information signal recorded in the spiral track on the optical disc, a tracking error signal St representing deviations of a beam spot formed on the optical disc by the light beam emitted from the optical head from the center of the spiral track, and a focus error signal Sf representing defocus of the light beam on the optical disc.

The reproduced information signal Si is supplied to an information signal processing circuit 14 and a demodulated or decoded information signal Sa is derived from the information signal processing circuit 14 to an output terminal 15. The reproduced information signal Si is supplied also to an envelope detecting circuit 16 and a detection output signal Sv having a voltage level corresponding to the envelope of the reproduced information signal Si is obtained from the envelope detecting circuit 16. The detection output signal Sv is supplied to one of input terminals of a level comparator 18 which has the other of the input terminals thereof supplied with a reference voltage Vo from a voltage source 17, and a pulse Sp which takes up a high level when the voltage level of the detection output signal Sv is lower than the reference voltage Vo is obtained from the level comparator 18. This pulse Sp is supplied to a defect detecting section 20.

The defect detecting section 20, to which the pulse Sp is supplied as an input pulse, comprises one example of the device detecting a defect of a disc-shaped record medium according to the present invention, generates an output pulse Sd and sends out it as a defect detection output signal as described later when a defect of the optical disc is read by the light beam emitted from the optical disc. The output pulse Sd obtained from the defect detecting section 20 is supplied to both a switch 30 provided in a tracking servo-control section and a switch 32 provided in a focus servo-control section.

The tracking error signal St and the focus error signal Sf obtained from the signal processing circuit 12 are supplied through variable resistors 22 and 24 for level adjustment to a fixed contact 30a of the switch 30 and a fixed contact 32a of the switch 32, respectively. The tracking error signal St obtained through the variable resistor 22 is supplied also to a restraining signal generating circuit 26 for tracking servo-control, which comprises a capacitor 26a and a resistor 26b, and a restraining signal St' is produced based upon the tracking error signal St in the restraining signal generating circuit 26 to be supplied to a fixed contact 30b of the switch 30. Further, the focus error signal Sf obtained through the variable resistor 24 is supplied also to a restraining signal generating circuit 28 for focus servo-control, which comprises a capacitor 28a and a resistor 28b, and a restraining signal Sf' is produced based upon the focus error signal St in the restraining signal generating circuit 28 to be supplied to a fixed contact 32b of the switch 32.

In the switch 30, a movable contact 30c is connected to the fixed contact 30a so that the tracking error signal St is obtained at the movable contact 30c when the output pulse Sd is not supplied thereto from the defect detecting section 20, and the movable contact 30c is connected to the fixed contact 30b so that the restraining signal St' is obtained in place of the tracking error signal St at the movable contact 30c when the output pulse Sd is supplied thereto from the defect detecting section 20. Similarly, in the switch 32, the movable contact 32c is connected to the fixed contact 32a so that the focus error signal Sf is obtained at the movable contact 32c when the output pulse Sd is not supplied thereto from the defect detecting section 20, and the movable contact 32c is connected to the fixed contact 32b so that the restraining signal Sf' is obtained in place of the focus error signal Sf at the movable contact 32c when the output pulse Sd is supplied thereto from the defect detecting section 20.

The tracking error signal St or the restraining signal St' derived from the switch 30 is supplied to a tracking control signal generating circuit 34 and a control signal Ct generated based on the tracking error signal St or the restraining signal St' is derived from the tracking control signal generating circuit 34 to a driving coil 40 for tracking control. The driving coil 40 supplied with the control signal Ct works for moving an optical element such as the objective lens in the optical head or the optical head in its entirety in the direction along the radius of the optical disc in accordance with the control signal Ct, so that the tracking servo-control is performed. In like manner, the focus error signal Sf or the restraining signal Sf' derived from the switch 32 is supplied to a focus control signal generating circuit 36 and a control signal Cf generated based on the focus error signal Sf or the restraining signal Sf' is derived from the focus control signal generating circuit 36 to a driving coil 42 for focus control. The driving coil 42 supplied with the control signal Cf works for moving the optical element such as the objective lens in the optical head or the optical head in its entirety in the direction along the axis of rotation of the optical disc in accordance with the control signal Cf, so that the focus servo-control is performed.

In such a configuration including an information signal reproducing section, a tracking servo-control section and a focus servo-control section as described above, the defect detecting section 20, which comprises one example of the device according to the present invention, performs a defect detection by which an operation state wherein a defect of the optical disc is read is detected.

In the case where the optical disc has a defect thereon or therein and when the defect of the optical disc is read by the light beam emitted from the optical head, a missing portion d occurs repeatedly in the reproduced information signal Si obtained from the signal processing circuit 12 for every revolution of the optical disc during a period of time depending on the size of the defect, as aforementioned and shown in FIG. 1A. From the envelope detecting circuit 16 to which the reproduced information signal containing the missing portions d is supplied, the detection output signal Sv having low level portions d' corresponding to the missing portions d in the reproduced information signal Si, as shown in FIG. 1B, is obtained. Then, the pulse Sp taking up the high level in response to the low level portion d' of the detection output signal Sv, which has the voltage level lower than the reference voltage level Vo, as shown in FIG. 1B, is obtained from the level comparator 18 in which the voltage level of the detection output signal Sv is compared with the reference voltage Vo, and the pulse Sp is supplied to the defect detecting section 20.

Accordingly, the pulse Sp which is obtained during a period of time corresponding to the missing portion d in the reproduced information signal Si, in other words, obtained when the defect of the optical disc is read is supplied to the defect detecting section 20 as the input pulse thereto, and in the defect detecting section 20, the defect detection is carried out and the output pulse Sd is sent out as the defect detection output signal, as described below.

Figure 4:
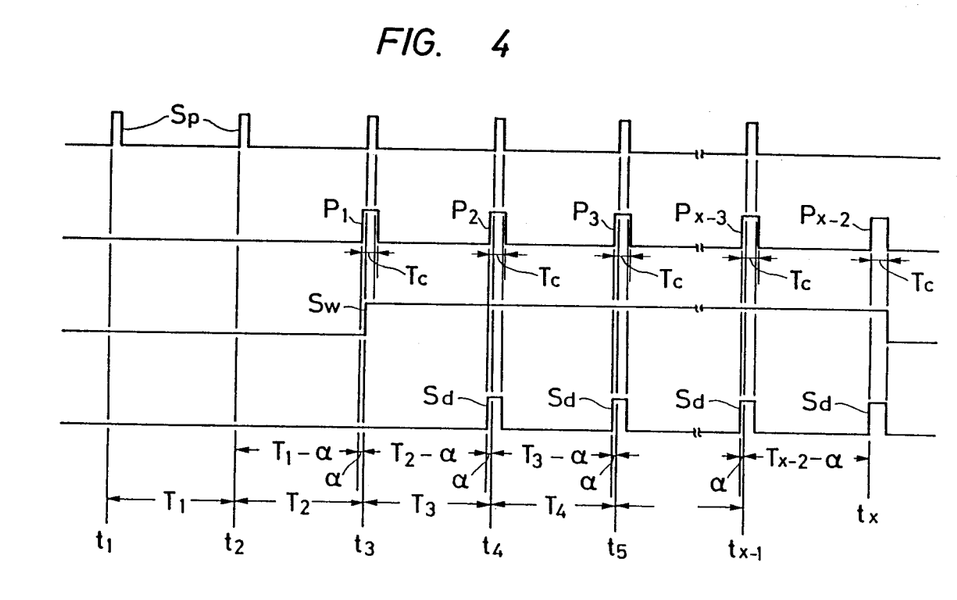
FIG. 4 is a time chart used for explaining the operation of the embodiment shown in FIG. 3.

In the operation state wherein the defect of the optical disc is read, the pulse Sp is supplied periodically to the defect detecting section 20 for every revolution of the optical disc, as shown in FIG. 4. In the defect detecting section 20, first, a period of time from a time point $t_1$ of the leading edge of the first one of the pulses Sp to a time point $t_2$ of the leading edge of the second one of the pulses Sp, namely, a period $T_1$ of the pulses Sp is measured. Then, a period of time from a time point $t_2$ of the leading edge of the second one of the pulses Sp to a time point $t_3$ of the leading edge of the third one of the pulses Sp, namely, a period $T_2$ of the pulses Sp is measured. After that, periods $T_3$, $T_4$, ... $T_{x-2}$ are measured successively at respective occurrences of the fourth one to the (x−1)th one of the pulses Sp.

Further, a predictive pulse $P_1$ which has its leading edge at a time point to which a time $T_1 - \alpha$ shorter by a short time $\alpha$ than the period $T_1$ elapses from the time point $t_2$ of the leading edge of the second one of the pulses Sp and its trailing edge at a time point to which a predetermined time Tc longer than the width of the pulse Sp elapses from the leading edge thereof is formed after the measurement of the period $T_1$. Then, a predictive pulse $P_2$ which has its leading edge at a time point to which a time $T_2 - \alpha$ shorter by the short time $\alpha$ than the period $T_2$ elapses from the time point $t_3$ of the leading edge of the third one of the pulses Sp and its trailing edge at a time point to which the predetermined time Tc elapses from the leading edge thereof is formed after the measurement of the period $T_2$. After that, in like manner, predictive pulses $P_3$ to $P_{x-2}$ relating to a time $T_3 - \alpha$ to a time $T_{x-2} - \alpha$ respectively are formed successively. These predictive pulses $P_1$ to $P_{x-2}$ set up respectively a period of time $T_1 - \alpha$ to a period of time $T_{x-2}$ in relation to the measured periods $T_1$ to $T_{x-2}$, and the leading edges of the predictive pulses $P_1$ to $P_{x-2}$ are antecedent respectively to the leading edges of the third one to the (x−1)th one of the pulses Sp.

Then, the period $T_2$ is compared with the period $T_1$, and it is judged that the pulse Sp obtained from the level comparator 18 results from the defect of the optical disc when the period $T_2$ is substantially equal to the period $T_2$. In the case where the period $T_2$ is substantially equal to the period $T_2$, a wide pulse signal Sw which has its leading edge at the time point $t_3$ of the leading edge of the third one of the pulses Sp to keep a high level until a time point tx of the trailing edge of the last one of the predictive pulses $P_1$ to $P_{x-2}$ and its trailing edge at the time point $t_3$ is produced as shown in FIG. 4.

With the wide pulse signal Sw thus formed, a time point of the leading edge of the output pulse Sd is fixed at the time point of the leading edge of each of the predictive pulses $P_2$ to $P_{x-2}$ which are obtained when the wide pulse signal Sw takes up the high level, and a time point of the trailing edge of the output pulse Sd is fixed at the time point of the trailing edge of the pulse Sp which occurs first after each of the time points of the leading edges of the output pulses Sd or at the time point of the trailing edge of the predictive pulses $P_{x-2}$. Consequently, the output pulses Sd each having the leading and trailing edges fixed in such a manner as escribed above are generated as shown in FIG. 4.

To the contrary, in the case where the period $T_2$ is not substantially equal to the period $T_2$, it is judged that the pulse Sp obtained from the level comparator 18 does not result from the defect of the optical disc and the wide pulse signal Sw is not produced, and therefore the output pulse Sd is not generated. Then, when any combination of successive two of the periods $T_2$ to $T_{x-2}$, such as the periods $T_2$ and $T_3$, the periods $T_3$ and $T_4$, and so on, which are substantially equal to each other, appears, the output pulse Sd is generated in the same manner as the case where the period $T_2$ is substantially equal to the period $T_2$.

The output pulses Sd thus produced are sent out as the defect detection output signal. Each of the output pulses Sd has the leading edge thereof antecedent to the leading edge of the pulse Sp corresponding thereto with the exception of the last one, and therefore the operation state wherein the defect of the optical disc is read is surely represented by each of the output pulses Sd without time-lag for every revolution of the optical disc during a period of time depending on the size of the defect of the optical disc.

Accordingly, when the defect of the optical disc is read by the light beam emitted from the optical head in the disc player, the restraining signals St' and Sf' are supplied at an appropriate timing by the switches 30 and 32, which are controlled by the output pulses Sd derived from the defect detecting section 20, to the tracking control signal generating circuit 34 and the focus control signal generating circuit 36, respectively, in place of the tracking error signal St and the focus error signal Sf which would have respective extraordinary levels, so that both the tracking servo-control and the focus servo-control are kept on being performed stably.

Figure 5:
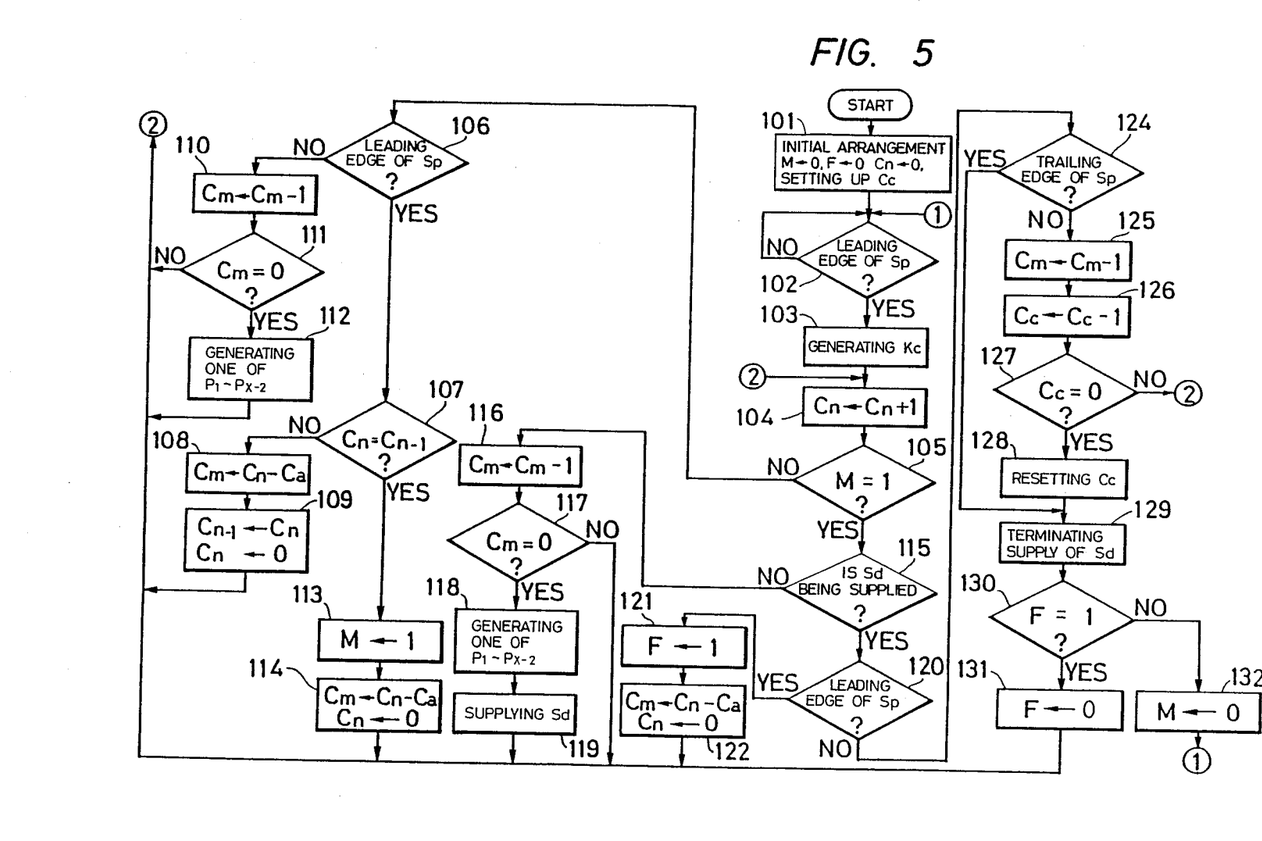
FIG. 5 is a flow chart showing an example of a control program of a microcomputer employed in the embodiment shown in FIG. 3.

The defect detecting section 20 effecting the defect detection as described above is constituted with, for example, a microcomputer and an example of the operation program of the microcomputer for such defect detection is carried out in accordance with a flow chart shown in FIG. 5.

In th case of the flow chart shown in FIG. 5, after the start, in the initial arrangement in process 101, a mode flag M used for checking detection of the period of the pulses Sp, a mode flag F used for checking occurrence of the pulses Sp and a count value Cn used for measuring the period of the pulses Sp are set to 0, and a count value Cc corresponding to a time Tc for determining the pulse width of each of the predictive pulses $P_1$ to $P_{x-2}$ is set up.

Then, in decision 102, it is checked whether the leading edge of the pulse Sp occurs or not. In the case where the leading edge of the pulse Sp does not occur, the check in the decision 102 is repeated. While, it is clarified that the leading edge of the pulse Sp occurs, a count clock signal Kc is generated in process 103 and then the count value Cn is increased by 1 in response to the count clock signal Kc in process 104.

Next, in decision 105, it is checked whether the mode flag M is 1 or not. If the mode flag M is not 1, it is judged that the period of the pulses Sp is being detected and therefore it is checked whether the leading edge of the pulse Sp occurs or not in decision 106. If it is clarified that the leading edge of the pulse Sp occurs, it is checked whether the count value Cn is equal to a count value Cn−1 which has been obtained at the time point of the leading edge of the pulse Sp occurring antecedently or not, in decision 107. In the case where the count value Cn is not equal to the count value Cn−1, a count value Cm used for setting a period of time is set up by subtracting a value Ca corresponding to a predetermined short time α from the count value Cn, in process 108. Then, the count value Cn−1 is set to have the same value as the count value Cn, and after that, the count value Cn is set to 0 in process 109. Thereafter, the step is returned to the the process 104, so that the count value Cn is further increased by 1 in response to the count clock signal Kc.

To the contrary, if it is clarified that the leading edge of the pulse Sp does not occur in the decision 106, the count value Cm set up in the process 108 is decreased by 1 in response to the count clock signal Kc, in process 110, and it is checked whether the count value Cm becomes 0 or not, in decision 111. If the count value Cm is not 0, the step is returned to the process 104. On the other hand, when it is clarified that the count value Cm becomes 0, since the period of time corresponding to the count value Cm has elapsed from the leading edge of the pulse Sp, one of the predictive pulses $P_1$ to $P_{x-2}$ is generated in process 112, and thereafter the step is returned to the process 104.

If it is clarified, as a result of the check in the decision 107, that the count value Cn is substantially equal to the count value Cn−1, the leading edge of the wide pulse signal Sw rising to the high level is formed and the mode flag M is set to 1 in process 113. In addition, the count value Cm is set up by subtracting the value Ca from the count value Cn, and after that, the count value Cn is set to 0 in process 114, and then the step is returned to the process 104.

Further, it is clarified that the mode flag M is 1 as a result of the check in the decision 105, it is judged that the pulses Sp occur periodically and therefore it is checked whether the output pulse Sd is being supplied or not, in decision 115. When the output pulse Sd is not being supplied, the count value Cm set up in the process 114 or a process 122 described later is decreased by 1 in response to the count clock Kc, in process 116, and then it is checked whether the count value Cm is 0 or not, in decision 117. If the count value Cm is not 0, the step is returned to the process 104. On the other hand, when it is clarified that the count value Cm becomes 0, since the period of time corresponding to the count value Cm has elapsed from the leading edge of the pulse Sp, one of the predictive pulses $P_1$ to $P_{x-2}$ is generated and the time point of the leading edge of the output pulse Sd is fixed at the time point of the leading edge of that predictive pulse, in process 118. Then, in process 119, the output pulse Sd is formed to have the leading edge at the time point fixed in the process 118 and to take up a high level, and is supplied to the switches 30 and 32. After that, the step is returned to the process 104.

When it is clarified that the output signal Sd is being supplied as a result of the check in the decision 115, it is checked whether the leading edge of the pulse Sp occurs or not in decision 120. If it is clarified that the leading edge of the pulse Sp occurs, the mode flag F is set to 1 in process 121. Further, the count value Cm is set up by subtracting the value Ca from the count value Cn, and after that, the count value Cn is set to 0, in process 122, and then the step is returned to the process 104.

To the contrary, if it is clarified as a result of the check in the decision 120 that the leading edge of the pulse Sp does not occur, it is further checked whether the trailing edge of the pulse Sp occurs or not, in decision 124. In the case where the trailing edge of the pulse Sp does not occur, the count value Cm set up in the process 122 is decreased by 1 in response to the count clock Kc in process 125 and the count value Cc set up in the initial arrangement is decreased by 1 in response to the count clock Kc in process 126, and then the step is advanced to decision 127.

In the decision 127, it is checked whether the count value Cc is 0 or not. If the count value Cc is not 0, the step is returned to the process 104. On the other hand, if it is clarified as a result of the check in the period of time corresponding to the count value Cc has elapsed from the leading edge of the pulse Sp, the count value Cc is reset, in process 128, and the time point of the trailing edge of the output pulse Sd is fixed at the time point to which the period of time corresponding to the count value Cc has elapsed from the leading edge of the pulse Sp and the trailing edge of the output pulse Sd is formed at the fixed time point to fall down from the high level, so that the supply of the output pulse Sd is terminated, in process 129.

Further, when it is clarified in the decision 124 that the trailing edge of the pulse Sp occurs, the step is directly advanced to the process 129, so that the time point of the trailing edge of the output pulse Sd is fixed at the time point of the trailing edge of the pulse Sp checked in the process 124 and the trailing edge of the output pulse Sd is formed at the fixed time point. As a result, the supply of the output pulse Sd is terminated.

After that, it is checked whether the mode flag F is 1 or not, in decision 130. If the mode flag F is 1, the mode flag F is changed to 0 in process 131 and the step is returned to the process 104. To the contrary, if the mode flag F is not 1, it is judged that the last one of the pulses Sp having occurred periodically occurs, and therefore the trailing edge of the wide pulse signal Sw falling from the high level is formed and the mode flag M is set to 0, in process 132. Then, the step is returned to the decision 102.

With such operation of the microcomputer as described above, when the wide pulse signal Sw continues to take up the high level, the output pulses Sd each having its leading edge at the time point of the leading edge of one of the predictive pulses $P_1$ to $P_{x-2}$ and its trailing edge at the time point of the trailing edge of the pulse Sp occurring first after the time point of the leading edge thereof or the time point of the trailing edge of the predictive pulse $P_{x-2}$, are generated and derived from the defect detecting section 20.

APPLICABILITY FOR INDUSTRIAL USE

The device for detecting a defect of a disc-shaped record medium according to the present invention is capable of being applied to broadly to disc players and is especially suitable to be used with a disc player for reproducing an information signal recorded on an optical disc, such as an optical digital audio disc player or an optical video disc player. Further, the device according to the present invention is also suitable for use in various types of disc players for reproducing an information signal recorded on a disc other than the optical disc.

I claim:

1. A device for detecting a defect of a disc-shaped record medium comprising; period detecting means (1) for measuring a period of input pulses which are obtained whenever the defect of the disc-shaped record medium is read, period setting means (2) for setting up a period of time shorter than the period of the input pulses detected by said period detecting means (1), leading edge fixing means (3) for fixing a time point of a leading edge of an output pulse at one of a first time point at which the period of the input pulses is detected by said period detecting means (1) and a second time point to which a time corresponding to the period of time set up by said period setting means (2) elapses from a time point of a leading edge of one of the input pulses appearing after the first time point, trailing edge fixing means (4) for fixing a time point of a trailing edge of the output pulse at one of a time point of a trailing edge of one of the input pulses appearing after the time point of the leading edge of the output pulse fixed by said leading edge fixing means (3) and a third time point to which a predetermined time elapses from the time point of the leading edge of the output pulse fixed by said leading edge fixing means (3), and output pulse generating mean (5) for producing the output pulse having its pulse width corresponding to a period of time from the time point fixed by said leading fixed by said leading edge fixing means (3) to the time point fixed by said trailing edge fixing means (4) and sending out the output pulse as a defect detection output signal in relation to the disc-shaped record medium.

2. A device according to claim 1, wherein said output pulse generating means (5) is operative to produce the output pulse after it is confirmed that a combination of two successive periods detected by said period detecting means (1) and substantially equal to each other appears.

3. A device according to one of claims 1 or 2 further comprising pulse signal producing means for producing a wide pulse signal which has its leading edge at a time point of the leading edge of the input pulse occurring after a time point at which it is confirmed that a combination of two successive periods detected by said period detecting means (1) and substantially equal to each other appears and its trailing edge at a time point at which periodical occurrence of the input pulses after the time point of the leading edge of the wide pulse signal is terminated, wherein said leading edge fixing means (3) is operative to fix the time point of the leading edge of the output pulse within a period of time wherein the wide pulse signal is obtained from said pulse signal producing means, and said trailing edge fixing means (4) is operative to fix the time point of the trailing edge of the output pulse within the period of time wherein the wide pulse signal is obtained from said pulse signal producing means.

4. A device according to claim 1, wherein said leading edge fixing means (3) is operative to produce a predictive pulse having its leading edge at a fourth time point to which a time corresponding to the period set up by said period setting means (2) elapses from the time point of the leading edge of the input pulse occurring after the period of the input pulses is detected by said period detecting means (1) and its trailing edge at a fifth time point to which a predetermined time longer than the width of each of the input pulses elapses from said fourth time point, and to fix the time point of the leading edge of the output pulse at said fourth time point.

5. A device according to claim 4, wherein said trailing edge fixing means (4) is operative to fix the time point of the trailing edge of the output pulse at one of a time point of the trailing edge of the input pulse occurring after the time point of the leading edge of the predictive pulse produced by said leading edge fixing means (3) and the time point of the trailing edge of the predictive pulse.

6. A device according to claim 5, wherein said output pulse generating means (5) is operative to produce the output pulse having its pulse width from the time point of the leading edge of the predictive pulse produced by said leading edge fixing means (3) to one of the time point of the trailing edge of the predictive pulse and a time point of the trailing edge of the input pulse occurring after the time point of the leading edge of the predictive pulse.

* * * * *